US007677343B2

(12) United States Patent
Kitai et al.

(10) Patent No.: US 7,677,343 B2
(45) Date of Patent: Mar. 16, 2010

(54) FOUR-WHEELED UTILITY VEHICLE

(75) Inventors: Haruo Kitai, Akashi (JP); Toru Minami, Kakogawa (JP); Hiroyuki Fujimoto, Fukuroi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 246 days.

(21) Appl. No.: 11/786,037

(22) Filed: Apr. 9, 2007

(65) Prior Publication Data

US 2007/0240927 A1    Oct. 18, 2007

(30) Foreign Application Priority Data

Apr. 10, 2006    (JP)    ............................. 2006-107847

(51) Int. Cl.
     *B62D 25/10*    (2006.01)

(52) U.S. Cl. ................ 180/89.17; 180/69.2; 180/69.24; 180/89.18; 180/291; 180/311; 180/312; 280/781; 280/783; 296/29; 296/37.15; 296/63; 296/203.01; 296/203.02; 296/203.03; 296/205

(58) Field of Classification Search ............. 180/89.17, 180/89.18, 208, 291, 311, 312, 908; 280/124.1, 280/781, 783; 296/29, 63, 203.01–203.03, 296/205, 37.15
See application file for complete search history.

(56) References Cited

U.S. PATENT DOCUMENTS

| 4,364,602 | A | * | 12/1982 | Rigazio | ...................... | 297/334 |
| 4,798,400 | A | * | 1/1989 | Kosuge | ...................... | 280/796 |
| 5,372,399 | A | * | 12/1994 | Ito et al. | .................. | 296/65.05 |
| 5,524,721 | A | * | 6/1996 | Yamauchi | .................. | 180/69.2 |
| 5,699,872 | A | * | 12/1997 | Miyakawa et al. | .......... | 180/291 |
| 6,497,453 | B2 | * | 12/2002 | Bates et al. | .............. | 297/188.1 |
| 6,752,443 | B1 | * | 6/2004 | Thompson et al. | ....... | 296/24.34 |
| 7,268,695 | B2 | * | 9/2007 | Konno et al. | .......... | 340/825.72 |
| 7,281,603 | B2 | * | 10/2007 | Fukuda | ........................ | 180/357 |
| 2004/0206567 | A1 | * | 10/2004 | Kato et al. | .................. | 180/291 |
| 2007/0045016 | A1 | * | 3/2007 | Nozaki | ...................... | 180/69.2 |
| 2008/0084082 | A1 | * | 4/2008 | Nakamura et al. | ....... | 296/37.15 |

FOREIGN PATENT DOCUMENTS

JP    SHO. 63-20284    1/1988

\* cited by examiner

*Primary Examiner*—Paul N Dickson
*Assistant Examiner*—James English
(74) *Attorney, Agent, or Firm*—Alleman Hall McCoy Russell & Tuttle LLP

(57) ABSTRACT

A four-wheeled utility vehicle including an engine unit mounted in the utility vehicle; and a vehicle body frame including a frame member that is disposed in the vicinity of the engine unit and is partially movable relative to the engine unit.

7 Claims, 8 Drawing Sheets

FOUR-WHEELED UTILITY VEHICLE

TECHNICAL FIELD

The present invention relates to a four-wheeled utility vehicle which is configured to travel off-road at a low speed and is suitably used to carry loads and various objects.

BACKGROUND OF THE INVENTION

A four-wheeled utility vehicle traveling off-road is typically a four-wheel-drive vehicle and is equipped with an engine unit mounted to a vehicle body frame thereof, a passenger seat in the vicinity of a center of a vehicle body thereof, and a load-carrying platform at a rear region of the vehicle body (see Japanese Laid-Open Patent Application Publication No. Sho. 63-20284). To be specific, the passenger seat is placed on seat support frame members provided on the vehicle body to extend substantially vertically upward from right and left sides of a main frame member forming a floor at a center section of the vehicle body, and a rear frame member is mounted behind the passenger seats to support the load-carrying platform. The engine unit is disposed in a lower space surrounded by the seat support frame members and the rear frame member. The engine unit includes a belt-drive continuously variable transmission (CVT) such as a belt converter on a side surface of the engine body.

When the engine unit of the four-wheeled utility vehicle is maintained, an operator cannot easily access the engine unit because the engine unit is surrounded by the frame members. So, the operator cannot easily maintain the engine unit. Especially when a belt of the belt-drive CVT is changed, it is necessary to remove a cover of the belt-drive CVT from the side of the vehicle body. In this case, the cover cannot be removed because the cover will be interfered with by the frame members surrounding the engine unit. In this situation, maintenance operation of the engine unit must be carried out after the engine unit has been taken out from the vehicle body.

SUMMARY OF THE INVENTION

The present invention addresses the above described conditions, and an object of the present invention is to provide a four-wheeled utility vehicle whose engine unit can be easily maintained by an operator.

According to the present invention, there is provided a four-wheeled utility vehicle comprising an engine unit mounted in the utility vehicle; and a vehicle body frame including a frame member that is disposed in the vicinity of the engine unit and is partially movable relative to the engine unit.

In such a construction, since the frame member disposed in the vicinity of the engine unit, which is a part of the vehicle body frame forming a frame of the four-wheeled utility vehicle, is movable away from the engine unit, it is possible to remove the frame member which is likely to become an obstacle when the operator is going to carry out the maintenance operation for the engine unit. Therefore, the operator can easily carry out the maintenance operation.

The vehicle body frame may include a main frame member substantially forming the vehicle body frame, and a pair of seat support frame members that are disposed on right and left sides of the engine unit and are configured to support passenger seats. At least one of the seat support frame members may be separable from the main frame member and may be configured to be movable away from the engine unit.

In a construction in which the pair of seat support frame members are disposed on right and left sides of the engine unit, these seat support frame members become the obstacle which makes it difficult for the operator to access the engine unit from the right and from the left. Accordingly, by moving the seat support frame member separable from the main frame member away from the engine unit, the operator can easily carry out the maintenance operation for the engine unit.

The seat support frame member which is separable from the main frame member may be removably mounted to the main frame member by a fastening device.

In such a construction, by merely removing the fastening device during the maintenance operation of the engine unit, the operator can easily remove the seat support frame member from the main frame member. Therefore, the maintenance operation becomes easier to perform and the vehicle may be constructed in a simple manner and at a low cost.

The seat support frame member which is separable from the main frame member may be mounted to the main frame member by a hinge to be pivotable around the hinge.

In such a construction, the operator can easily move the seat support frame member away from the engine unit by pivoting the seat support frame member around the hinge. The operator can move the seat support frame member in fewer steps and therefore can easily carry out the maintenance operation.

The engine unit may include an engine body and a belt-drive continuously variable transmission that is mounted to a side surface of the engine body, and the seat support frame member which is separable from the main frame member may be disposed opposite to the belt-drive continuously variable transmission.

In such a construction, since the operator can remove the frame member which is disposed opposite to the belt-drive continuously variable transmission and is likely to become an obstacle when the operator is going to carry out the maintenance operation for the belt-drive continuously variable transmission which is required to be frequently maintained, such as for example, a belt change, the maintenance operation becomes easier and more efficient.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the drawings.

Embodiment 1

Figure 1:
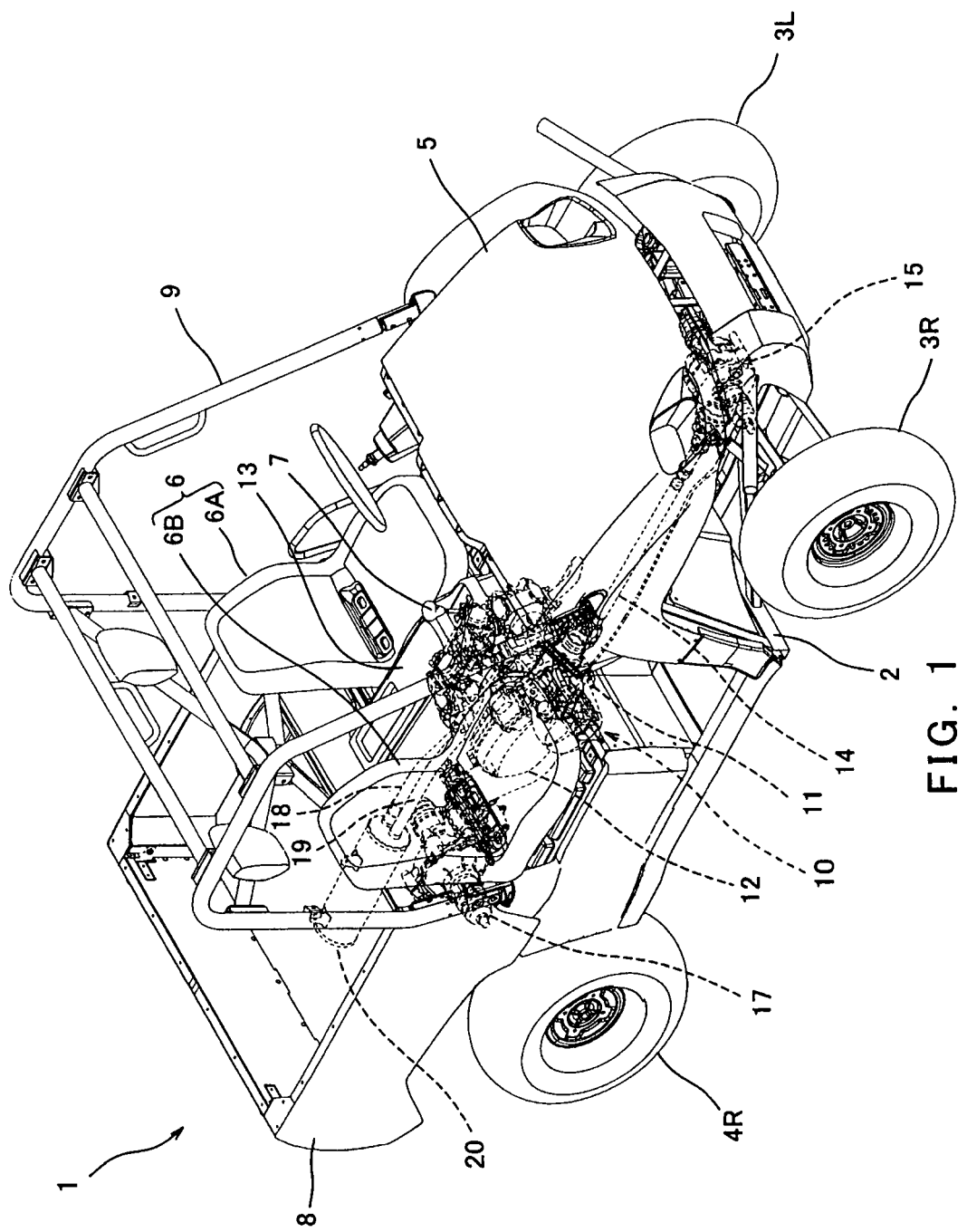
FIG. 1 is a perspective view of a four-wheeled utility vehicle according to a first embodiment of the present invention.
Figure 2:
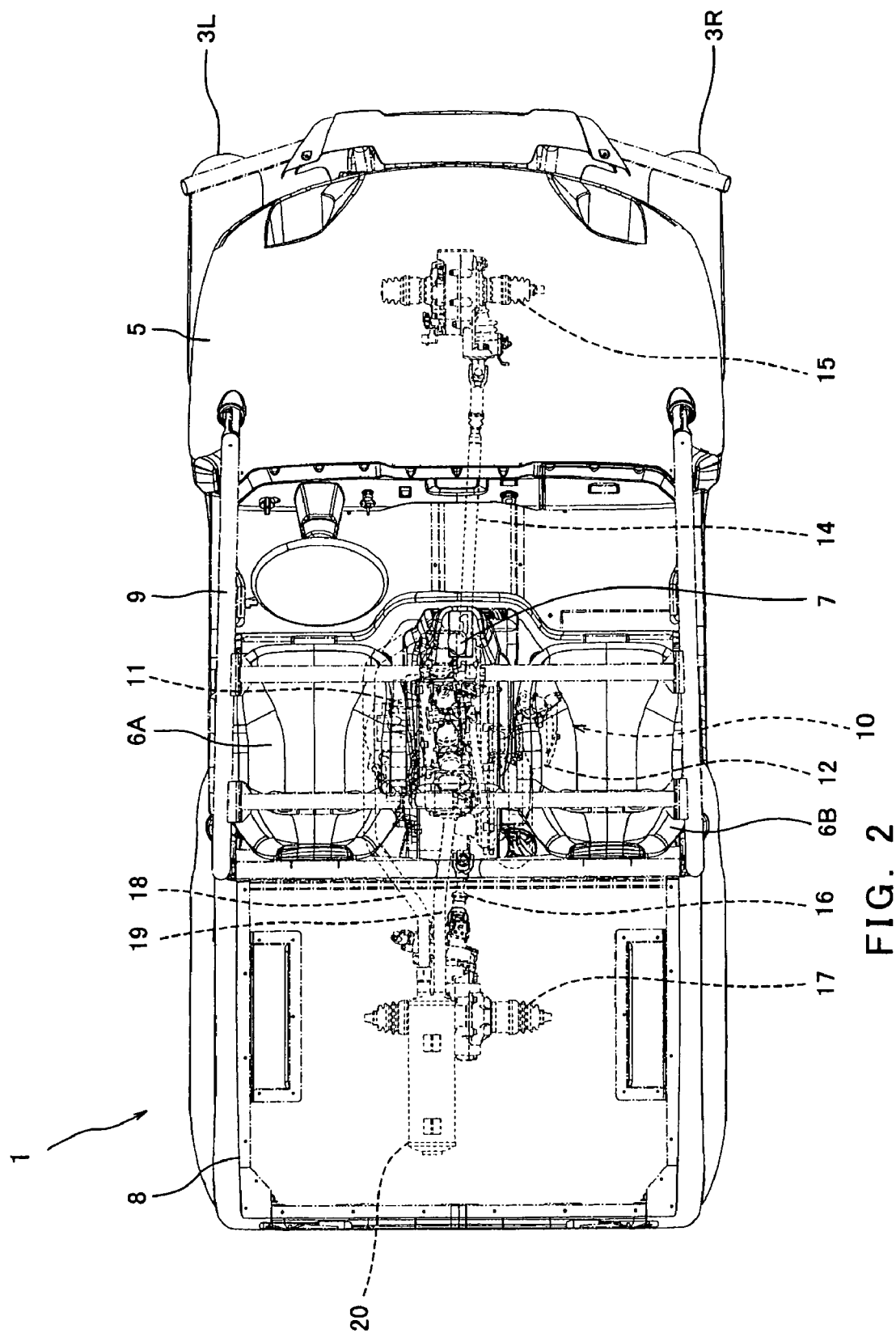
FIG. 2 is a plan view of the four-wheeled utility vehicle of FIG. 1.
Figure 3:
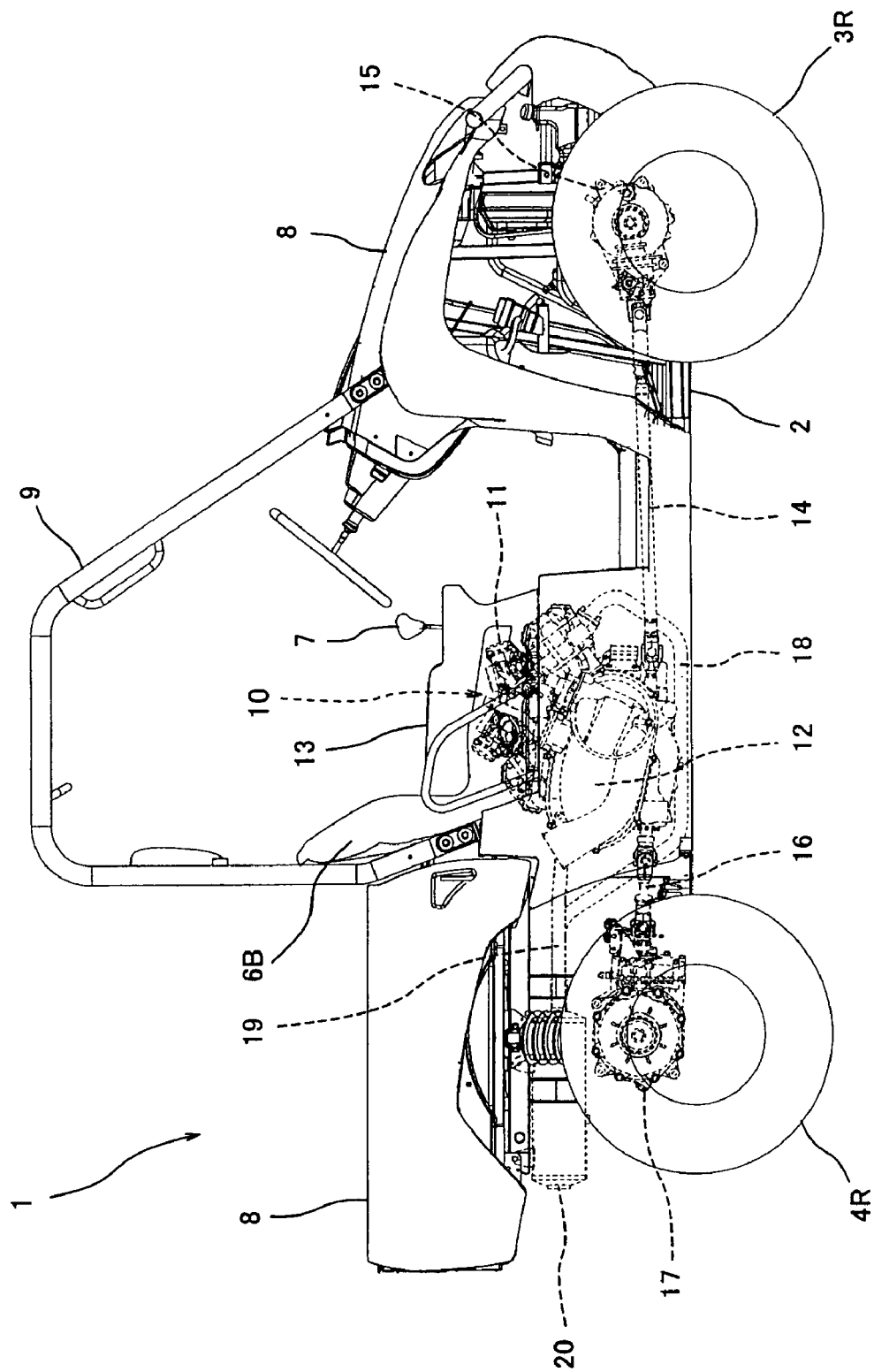
FIG. 3 is a right side view of the four-wheeled utility vehicle of FIG. 1.

FIG. 1 is a perspective view of a four-wheeled utility vehicle 1 according to a first embodiment of the present invention. FIG. 2 is a plan view of the four-wheeled utility vehicle 1 of FIG. 1. FIG. 3 is a right side view of the four-wheeled utility vehicle 1 of FIG. 1. In this embodiment described below, the directions are referenced from the perspective of a rider (not shown) riding in the four-wheeled utility vehicle 1 except for specified cases. As shown in FIGS. 1 to 3, the four-wheeled utility vehicle (hereinafter referred to as a utility vehicle) 1 includes right and left front wheels 3R and 3L at a front portion of a vehicle body frame 2 and rear right wheel 4R (left rear wheel is not shown) at a rear portion of the vehicle body frame 2. A hood 5 is mounted over the front wheels 3R and 3L. A pair of right and left passenger seats 6 (driver's seat 6A and assistant driver's seat 6B) are located in the vicinity of a center in a longitudinal section of a vehicle body of the utility vehicle 1 behind the hood 5. A seat separating wall 13 is provided between the left and right passenger seats 6A and 6B. A transmission operation lever 7 is attached to a front portion of the seat separating wall 13. The seat separating wall 13 has a hollow structure and protrudes higher than a seat surface of the passenger seats 6.

A load-carrying platform 8 is mounted behind the passenger seats 6 so as to extend rearward from a location near a rear portion of the passenger seats 6 and over the rear wheels R. A cabin frame member 9 extends from right and left sides of a rear portion of the hood 5 to a region behind the passenger seats 6 so as to surround a passenger riding space in which the passenger seats 6 are mounted. The cabin frame member 9 is formed of a metal round pipe member and opens forward and backward, rightward and leftward, and upward. The cabin frame member 9 serves to protect the passengers and is used as a mounting member by which a roof or a hood for blocking rain or sunshine is mounted. It should be noted that the utility vehicle 1 is not equipped with doors or front glass, because an upper limit of its traveling speed is set lower and the passengers can easily get in and out of the utility vehicle 1 for the purpose of higher work efficiency.

An engine unit 10 for driving the utility vehicle 1 is mounted in a space below the seat separating wall 13. The engine unit 10 is disposed between right and left seat support frame members 32 and 35 described later (see FIG. 4) right below the passenger seat 6 and at a slightly rear section in the longitudinal direction. The engine unit 10 includes an engine body 11 having multiple cylinders and a belt-drive continuously variable transmission (CVT) (belt converter) 12 mounted to a right side surface of the engine body 11.

A front gear unit (front final reduction gear unit) 15 is coupled to a front wheel output shaft (not shown) of the engine unit 10 through a front propeller shaft 14 extending substantially in the longitudinal direction of the utility vehicle 1. The front gear unit 15 is configured to change a direction of a rotational force, or the like. A rear gear unit (rear final reduction gear unit) 17 is coupled to a rear wheel output shaft (not shown) of the engine unit 10 through a rear propeller shaft 16 extending substantially in the longitudinal direction. The rear gear unit 17 is configured to change the direction of the rotational force, or the like. Rear end portions of exhaust pipes 18 and 19 extend rearward from the cylinders of the engine body 11 and are coupled to a muffler 20 disposed below the load-carrying platform 8.

Figure 4:
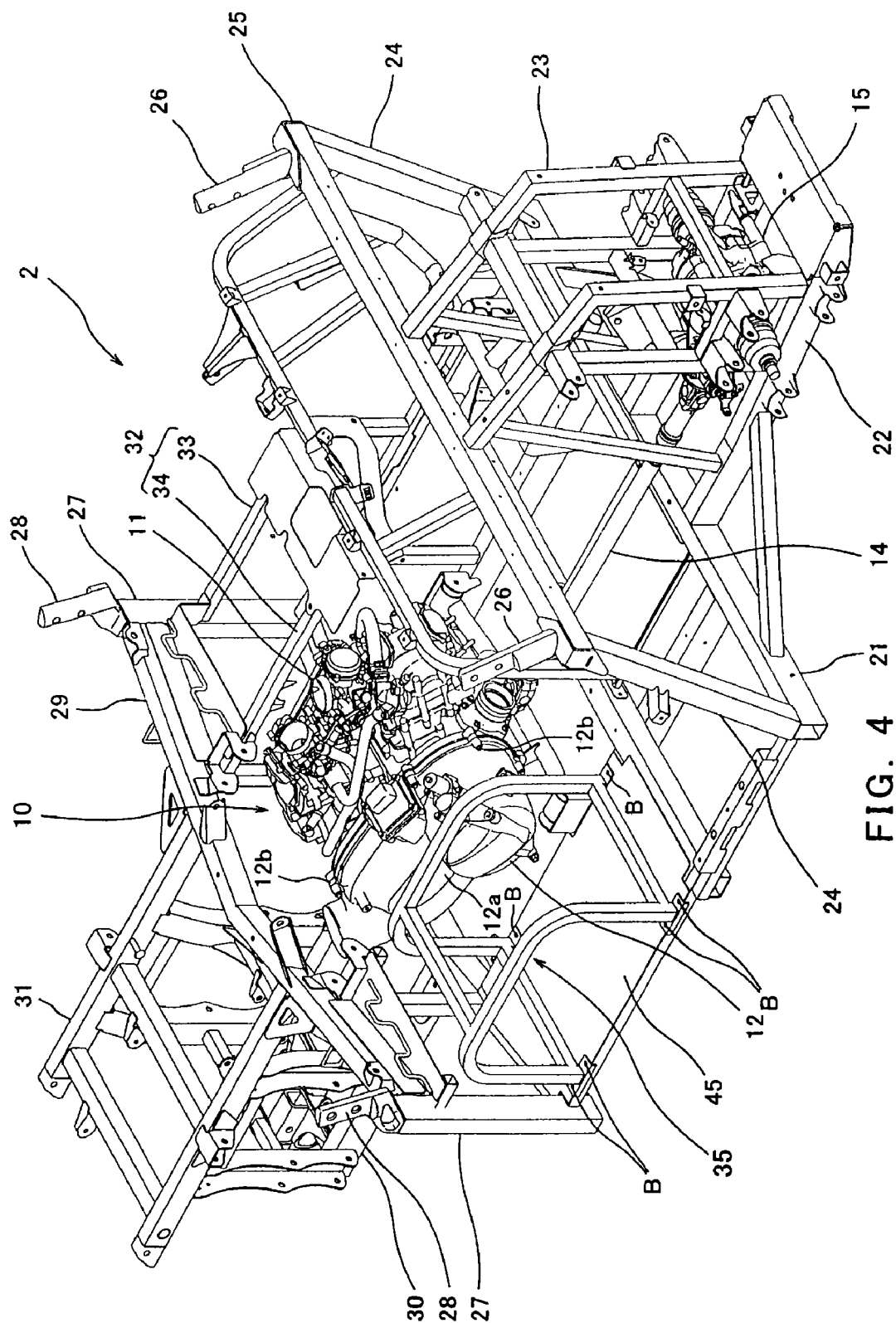
FIG. 4 is a perspective view of a vehicle body frame of the four-wheeled utility vehicle of FIG. 1.

FIG. 4 is a perspective view of the vehicle body frame 2 of the four-wheeled utility vehicle 1 of FIG. 1. As shown in FIG. 4, the vehicle body frame 2 is mainly formed of metal hollow pipe members with rectangular cross-sections, and includes a main frame member 21 disposed between the front wheels 3R and 3L and the rear wheels (i.e. rear right wheel 4R in FIG. 1) to form a floor of the passenger riding space. A front frame member 22 protrudes forward from a front end portion of the main frame member 21 and is configured to support the front gear unit 15. A pair of front masts 24 extend upward from both side portions of a front end of the main frame member 21. Upper end portions of the right and left front masts 24 are coupled to each other by a front cross member 25. An inverted-L shaped hood support frame member 23 is mounted between the front frame member 22 and the front cross member 25 and is configured to support the hood 3 (see FIGS. 1 and 3). Mounting bracket members 26 extend vertically upward from right and left side portions of the cross members 25. The cabin frame member 9 (see FIGS. 1 to 3) is coupled to the mounting bracket members 26.

A rear frame member 30 protrudes rearward from a rear end portion of the main frame member 21 and is configured to support the rear gear unit 17 (see FIGS. 1 to 3). A pair of rear masts 27 extend upward from both side portions of a rear end of the main frame member 21. Upper end portions of the right and left front masts 27 are coupled to each other by a rear cross member 29. Mounting bracket members 28 extend vertically upward from right and left side portions of the rear cross member 29. The cabin frame 9 (see FIGS. 1 to 3) is coupled to the mounting bracket members 28. A platform support frame member 31 protrudes horizontally rearward from the rear cross member 29 and is configured to support the load-carrying platform 8 (see FIGS. 1 to 3).

The engine unit 10 is mounted to the main frame member 21 at a center region of the main frame member 21 in a lateral direction thereof and at a slightly rear region of the main frame member 21 in a longitudinal direction thereof. The engine unit 10 is disposed in such a manner that the belt-drive CVT 12 is positioned at a right side surface of the engine body 11. The belt-drive CVT 12 has a cover 12a attached to the engine body 11 by bolts from the right so that an internal belt (not shown) is not exposed.

On the left side of the engine unit 10, a pair of L-shaped frame members 33 and 34 extend vertically upward from the main frame member 21 and are coupled to the rear masts 27 so as to be spaced apart from each other. The L-shaped frame members 33 and 34 form a left seat support frame member 32 that supports the driver seat 6A (see FIGS. 1 and 2). On the right side of the engine unit 10, a right seat support frame member 35 is removably mounted on the main frame member 21 by fastening devices such as bolts B. The right seat support frame member 35 is configured to support the front passenger seat 6B (see FIGS. 1 to 3). By removing the bolts B, the right seat support frame member 35 is movable to the right relative to the engine unit 10. Since the right seat support frame member 35 is positioned on the right side of the cover 12a of the belt-drive CVT 12, it will interfere with the cover 12a when the cover 12a is moved to the right to be removed, and as a result, the cover 12a cannot be removed.

Since the left seat support frame member 32 is disposed on the left side of the engine unit 10, the right seat support frame member 35 is disposed on the right side of the engine unit 10, the front frame member 22 and the hood support frame member 23 are disposed on the front side of the engine unit 10, and the rear frame member 30 and the platform support frame member 31 are disposed behind the engine unit 10, the engine unit 10 is surrounded from forward and rearward, and from rightward and leftward. It should be noted that the above mentioned frame members forming the vehicle body frame 2 are fastened to each other by welding or the like except for the right seat support frame member 35.

Figure 5:
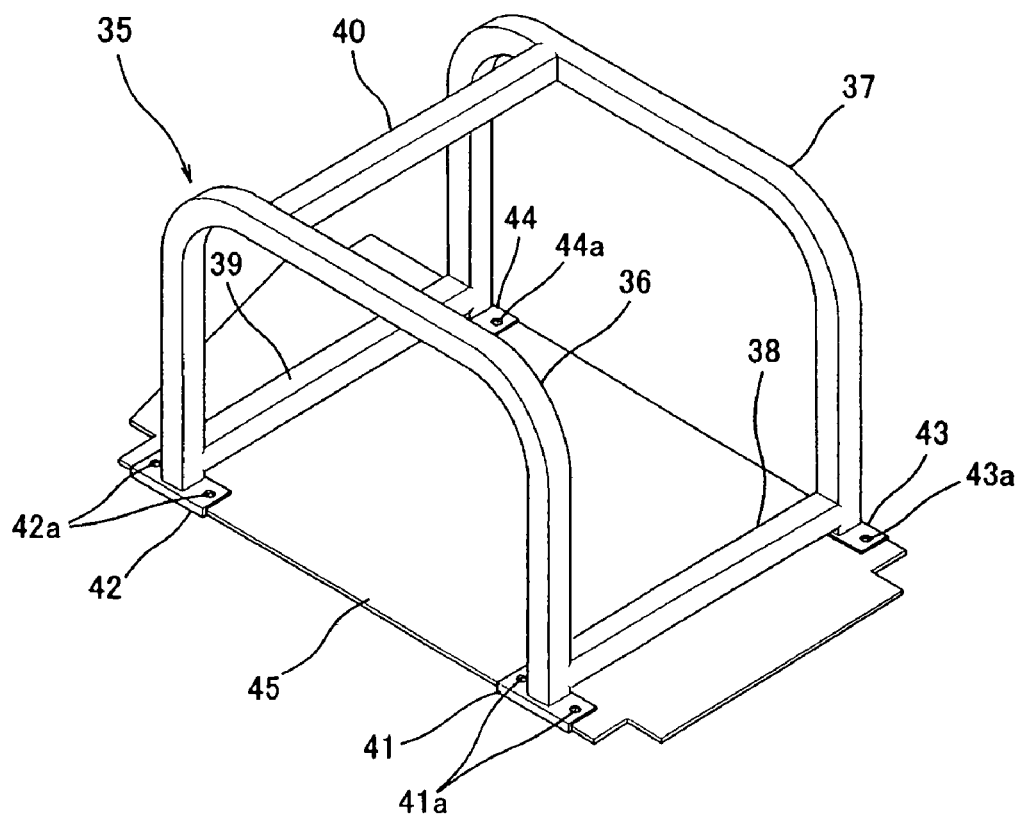
FIG. 5 is a perspective view of a right seat support frame of the four-wheeled utility vehicle of FIG. 1.

FIG. 5 is a perspective view of the right seat support frame member 35 of the four-wheeled utility vehicle 1 of FIG. 1. As shown in FIG. 5, the right support frame member 35 includes a pair of right and left inverted-U shaped frame member portions 36 and 37 extending in the longitudinal direction, lower cross frame member portions 38 and 39 extending in the lateral direction to couple lower parts of the U-shaped frame member portions 36 and 37, and an upper cross frame member portion 40 extending in the lateral direction to couple upper parts of the U-shaped frame member portions 36 and 37. Plate-shaped bracket members 41 and 43 are attached to front lower end portions of the U-shaped frame member portions 36 and 37, and plate-shaped bracket members 42 and 44 are attached to rear lower end portions of the U-shaped frame member portions 36 and 37. The bracket members 41, 42, 43, and 44 have bolt holes 41a, 42a, 43a, and 44a, respectively. A flat bottom board 45 is coupled to the lower surfaces of the bracket members 41 to 44 so that electric components (not shown) may be mounted on the bottom board 45. The bottom board 45 has bolt holes (not shown) corresponding to the bolt holes 41a to 44a of the bracket members 41 to 44.

Figure 6:
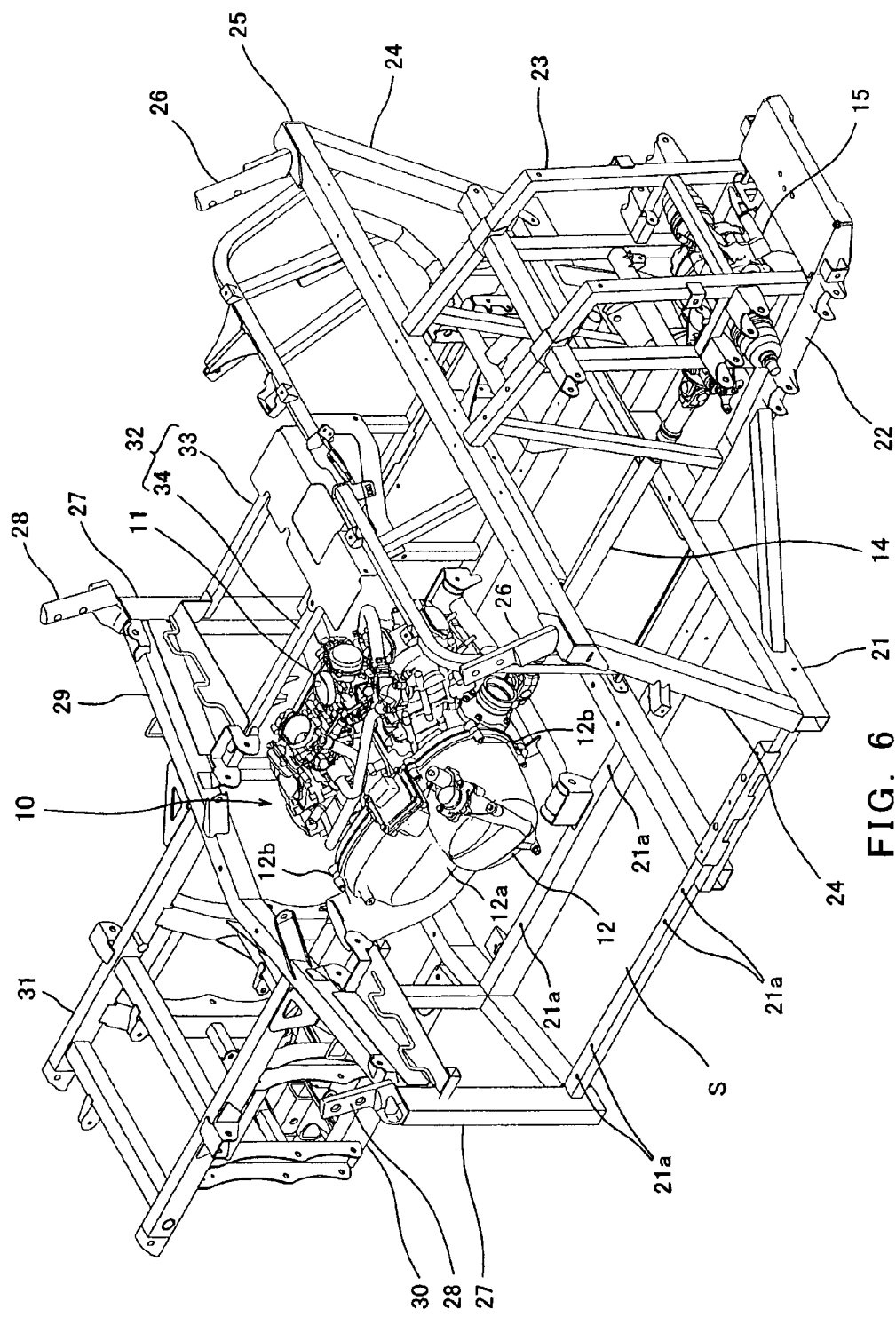
FIG. 6 is a perspective view of the vehicle body frame showing a state where a right sheet support frame member has been removed from the four-wheeled utility vehicle of FIG. 1.

FIG. 6 is a perspective view of the vehicle body frame 2 showing a state where the right sheet support frame member 35 has been removed from the four-wheeled utility vehicle 1 of FIG. 1. As shown in FIG. 6, bolt holes 21a are formed to respectively correspond to the bolt holes 41a to 44a of the bracket members 41 to 44 of the right seat support frame member 35 (see FIG. 5). The main frame member 21 has an opening S at a location under the right seat support frame member 35 (see FIG. 4). The bottom board 45 (FIGS. 4 and 5) is placed at the frame member portions defining the opening S to close the opening S.

In the construction shown in FIG. 4, the operator cannot easily access the engine unit 10 because the left seat support frame member 32 and the right seat support frame member 35 are disposed on the left side and on the right side of the engine unit 10 and will become an obstacle when the operator is going to carry out the maintenance operation of the engine unit 10. However, by removing the bolts B and by removing the right seat support frame member 35 from the main frame member 21, a space is created on the right side of the engine unit 10. Thus, the operator can access the engine unit 10 from the right and carry out maintenance operation of the engine unit 10 (see FIG. 6).

Furthermore, since the right seat support frame member 35 that is opposite to the belt-drive CVT 12 of the engine unit 10 is removably mounted by the bolts, the operator can remove the cover 12a of the belt-drive CVT 12 required to be frequently maintained and can easily carry out maintenance such as changing the belt. In addition, since the right seat support frame member 35 is removably mounted to the main frame member 21 by the bolts B, the maintenance operation performed on the engine unit 10 can be easily carried out in a simple manner and at a low cost. Whereas the right seat support frame member 35 has a structure in which the bottom board 45 is welded to the lower end portions of the U-shaped frame member portions 36 and 37 via the bracket members 41 to 44 as shown in FIG. 5, the bottom board 45 may alternatively be directly welded to the lower end portions of the U-shaped frame member portions 36 and 37 without the bracket members 41 to 44.

Embodiment 2

Figure 7:
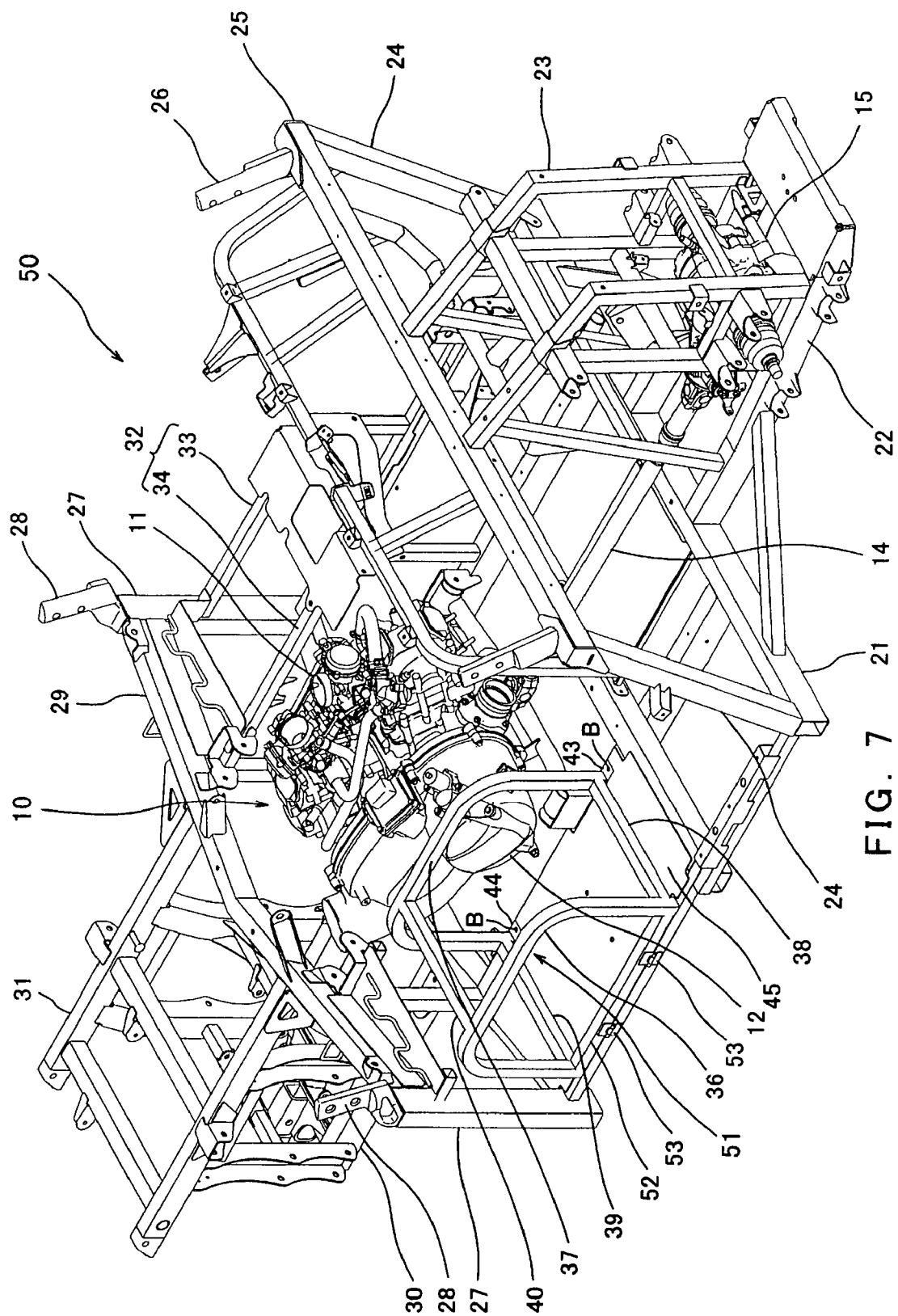
FIG. 7 is a perspective view of a vehicle body frame of a four-wheeled utility vehicle according to a second embodiment of the present invention.
Figure 8:
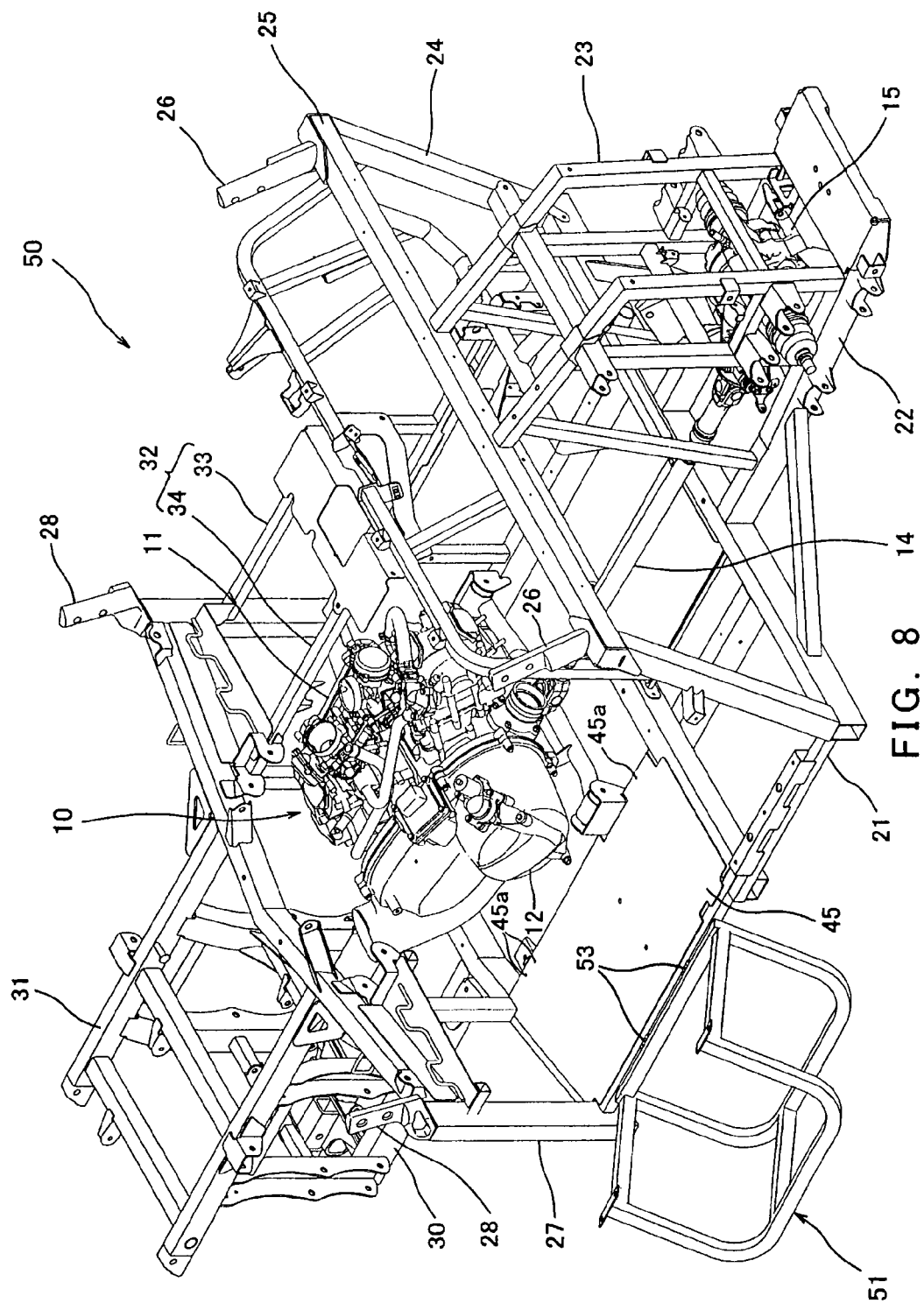
FIG. 8 is a perspective view of the vehicle body frame, showing a state where the right sheet support frame member of the four-wheeled utility vehicle of FIG. 7 is pivoted.

FIG. 7 is a perspective view of a vehicle body frame 50 of the four-wheeled utility vehicle 1 according to a second embodiment of the present invention. FIG. 8 is a perspective view of the vehicle body frame 50, showing a state where a right sheet support frame member 51 of the four-wheeled utility vehicle 1 of FIG. 7 is pivoted. In the second embodiment, the same reference numbers as those of the first embodiment are used to identify the same or corresponding parts.

As shown in FIG. 7, the right seat support frame member 51 is mounted onto the main frame member 21 by a pair of hinges 53 to be pivotable around the hinges 53 on the right side of the engine unit 10. The right seat support frame member 51 includes the pair of right and left inverted-U-shaped frame member portions 36 and 37 extending in the longitudinal direction, the lower cross frame member portions 38 and 39 extending in the lateral direction to couple lower parts of the U-shaped frame member portions 36 and 37, the upper cross frame member portion 40 extending in the lateral direction to couple upper parts of the U-shaped frame member portions 36 and 37, and a side frame member portion 52 extending in the longitudinal direction to couple front and rear lower end portions of the right U-shaped frame member 36.

The side frame member portion 52 of the right seat support frame member 51 is coupled to the main frame member 21 by the pair of hinges 53. The right seat support frame member 51 is pivotable around the hinges 53 so as to move away from the engine unit 10. The plate-shaped bracket members 43 and 44 are mounted to front and rear lower end portions of the left U-shaped frame member portion 37 of the right seat support frame member 51. The plate-shaped bracket members 43 and 44 have bolt holes.

As shown in FIG. 8, the bottom board 45 is placed on the main frame member 21 under the right seat support frame member 51 and is separable from the right seat support frame member 51. The bottom board 45 has bolt holes 45a corresponding to the bolt holes of the bracket members 43 and 44. The bolts B are inserted into the bolt holes of the bracket members 43 and 44, the bolt holes 45a of the bottom board 45, and bolt holes of the main frame member 21 to fasten the right seat support frame member 51 to the main frame member 21 (see FIG. 7).

In the above construction, the operator can easily move away the right seat support frame member 51 from the engine unit 10 by pivoting the right seat support frame member 51 to the right around the hinges 53. The operator can move the right seat support frame member 51 in fewer steps and therefore can easily carry out the maintenance operation.

Whereas in the above described embodiments, the right seat support frame members 35 and 51 are movable and the left seat support frame member 32 is fixed, the left seat support frame member 32 may be movable.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A four-wheeled utility vehicle comprising:
an engine unit mounted in the utility vehicle; and
a vehicle body frame including a frame member that is disposed in the vicinity of the engine unit and is partially movable relative to the engine unit;
wherein the vehicle body frame includes a main frame member substantially forming the vehicle body frame, and a pair of seat support frame members that are disposed on right and left sides of the engine unit, each of the seat support frame members being positioned directly below and configured to support a respective one of a pair of passenger seats mounted in the utility vehicle;
wherein the engine unit includes an engine body and a belt-drive continuously variable transmission that is mounted to a side surface of the engine body, and at least one of the seat support frame members which is separable from the main frame member is disposed opposite to the belt-drive continuously variable transmission so that the seat support frame member interferes with a cover of the transmission when the cover is moved to be removed; and
wherein the seat support frame member is configured to be movable away from the engine unit so that the seat support frame member does not interfere with the cover when the cover is moved to be removed.

2. The four-wheeled utility vehicle according to claim 1, wherein the seat support frame member which is separable from the main frame member is removably mounted to the main frame member by a fastening device.

3. The four-wheeled utility vehicle according to claim 1, wherein the seat support frame member which is separable from the main frame member is mounted by a hinge to the main frame member to be pivotable around the hinge.

4. The four-wheeled utility vehicle according to claim 1, wherein the seat support frame member includes a pair of right and left inverted-U shaped frame member portions extending in the longitudinal direction, lower cross frame member portions extending in the lateral direction to couple lower parts of the U-shaped frame member portions, and an upper cross frame member portion extending in the lateral direction to couple upper parts of the U-shaped frame member portions.

5. The four-wheeled utility vehicle according to claim 4, wherein a bottom board is coupled to lower end portions of the U-shaped frame member portions.

6. The four-wheeled utility vehicle according to claim 5, wherein the main frame member has an opening at a location under the seat support frame member, and the bottom board is placed at frame member portions defining the opening to close the opening.

7. The four-wheeled utility vehicle according to claim 5, wherein an electric component is mounted on the bottom board.

* * * * *